US012735523B2

(12) United States Patent
Gerard

(10) Patent No.: US 12,735,523 B2
(45) Date of Patent: Sep. 15, 2026

(54) PRECURSOR COMPOSITION FOR ACRYLIC THERMOPLASTIC COMPOSITES AND ITS METHOD OF PREPARATION AND USE

(71) Applicant: Arkema France, Colombes (FR)

(72) Inventor: Pierre Gerard, Denguin (FR)

(73) Assignee: Arkema France, Puteaux (FR)

( * ) Notice: Subject to any disclaimer, the term of this patent is extended or adjusted under 35 U.S.C. 154(b) by 1066 days.

(21) Appl. No.: 16/977,221

(22) PCT Filed: Mar. 5, 2019

(86) PCT No.: PCT/EP2019/055433
§ 371 (c)(1),
(2) Date: Sep. 1, 2020

(87) PCT Pub. No.: WO2019/170666
PCT Pub. Date: Sep. 12, 2019

(65) Prior Publication Data

US 2021/0009740 A1 Jan. 14, 2021

(30) Foreign Application Priority Data

Mar. 5, 2018 (FR) ................................ FR18.51893

(51) Int. Cl.
*C08F 265/06* (2006.01)
*C08F 265/00* (2006.01)
*C08J 5/24* (2006.01)
*C08L 33/00* (2006.01)

(52) U.S. Cl.
CPC .......... *C08F 265/06* (2013.01); *C08F 265/00* (2013.01); *C08J 5/243* (2021.05); *C08J 5/244* (2021.05); *C08J 2351/00* (2013.01); *C08L 33/00* (2013.01)

(58) Field of Classification Search
CPC ........ C08F 265/06; C08F 265/00; C08F 2/14; C08F 4/34; C08F 4/38; C08J 5/243; C08J 5/244; C08J 2351/00; C08J 2333/02; C08J 2333/06; C08L 33/00; B29C 70/504; B29C 70/06; D06M 15/263; B29B 15/122; B29K 2033/04; B29K 2105/0872
See application file for complete search history.

(56) References Cited

U.S. PATENT DOCUMENTS 4,230,766 A 10/1980 Gaussens et al.
9,777,140 B2 10/2017 Gerard et al.
10,040,889 B2 8/2018 Gerard et al.
10,711,117 B2 7/2020 Gerard et al.
2012/0121881 A1 5/2012 Kim et al.
2012/0305521 A1* 12/2012 Hubbard .............. H10F 77/169 216/13
2015/0218362 A1 8/2015 Gerard et al.
2015/0252160 A1* 9/2015 Teranishi ............ C09D 163/00 524/502

FOREIGN PATENT DOCUMENTS

EP 2471849 A2 * 7/2012 ................ C08J 5/18
JP 2005-324456 A 11/2005
JP 2007-177203 A 7/2007
JP 2007-191675 A 8/2007
JP 2009091459 A2 4/2009
JP 2010-155954 A 7/2010
JP 2012-091418 A 5/2012
JP 2013-503233 A 1/2013
JP 2015-522690 A 8/2015
WO 2014013028 A1 1/2014

OTHER PUBLICATIONS

Office Action (Notice of Reasons for Refusal) issued on Aug. 8, 2023, by the Japanese Patent Office in corresponding Japanese Patent Application No. 2020-546357, and an English Translation of the Office Action. (13 pages).

* cited by examiner

*Primary Examiner* — Jessica M Roswell
(74) *Attorney, Agent, or Firm* — Buchanan Ingersoll & Rooney PC

(57) ABSTRACT

The present invention relates to a precursor composition for (meth) acrylic thermoplastic composites, its method of preparation and its use. In particular it relates to a semi-fabricated composition comprising a (meth) acrylic polymer, a monomer, a fibrous material and at least one initiator. More particularly the present invention relates to a precursor composition comprising a (meth) acrylic polymer, a monomer, a fibrous material and at least two initiators. The present invention relates also to a method of preparation of a composition comprising a (meth) acrylic polymer, a monomer, a fibrous material and at least two initiators.

19 Claims, 1 Drawing Sheet

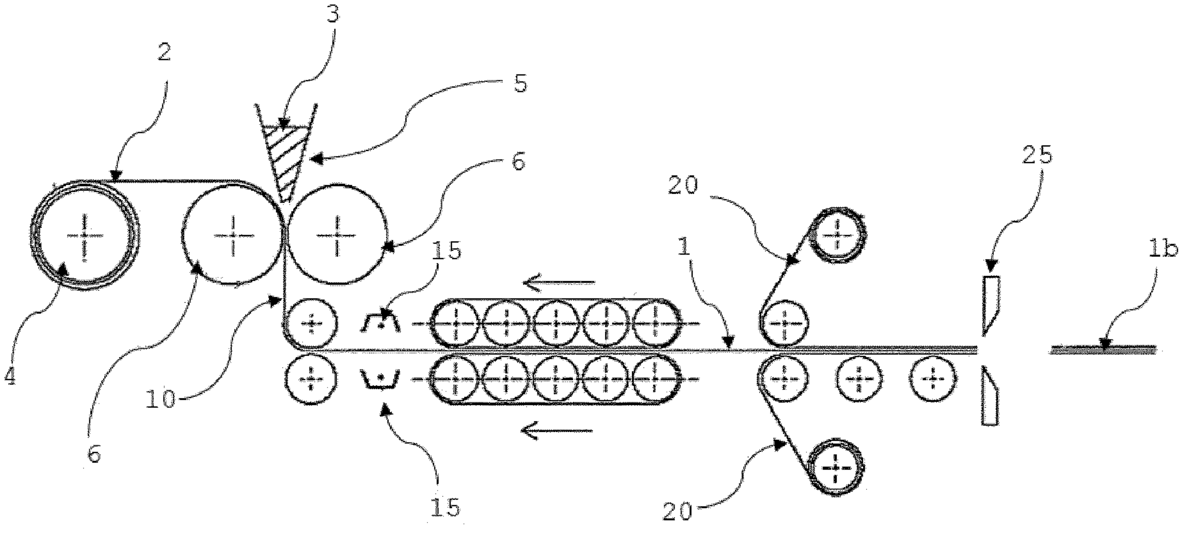
3
2
5
6
25
20
15
1
1b
4
10
6
15
20

PRECURSOR COMPOSITION FOR ACRYLIC THERMOPLASTIC COMPOSITES AND ITS METHOD OF PREPARATION AND USE

This application claims benefit, under U.S.C. § 119 or § 365 of PCT Application Number PCT/EP2019/055433, filed Mar. 5, 2019, and French Patent Application Number FR 1851893 filed Mar. 5, 2018, these documents being incorporated herein by reference.

FIELD OF THE INVENTION

The present invention relates to a precursor composition for (meth)acrylic thermoplastic composites, its method of preparation and its use.

In particular it relates to a semi-fabricated composition comprising a (meth) acrylic polymer, a monomer, a fibrous material and at least one initiator.

More particularly the present invention relates to a precursor composition comprising a (meth) acrylic polymer, a monomer, a fibrous material and at least two initiators.

The present invention relates also to a method of preparation of a composition comprising a (meth) acrylic polymer, a monomer, a fibrous material and at least two initiators.

TECHNICAL PROBLEM

A composite material is a macroscopic combination of two ore more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone. Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

The most important class in view of volume in commercial industrial scale, are composites with organic matrices, where the matrix material is a generally polymer. The principal matrix or continuous phase of a polymeric composite material is either a thermoplastic polymer or a thermosetting polymer.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently. In order to prepare the polymeric composite material the prepolymer is mixed with the other component (for example glass beads for a particulate composite or short fibers for a fibrous composite) or the other component is wetted or impregnated (for example woven nets) and cured afterwards.

Examples for prepolymers or matrix material for thermoset polymers are unsatured polyesters, vinylesters, epoxy or phenolic ones. This manufacturing of the semi-fabricated products yields to the so called prepregs.

A further disadvantage of a thermoset polymer matrix is its crosslinkage. The matrix cannot be easily shaped in other forms. Once the polymer has been cured the form is fixed. This makes also difficult the recycling of the thermoset composite material.

Thermoplastic polymers consist of linear or branched polymers, which are not crosslinked. The thermoplastic polymers are heated in order to mix the two constituents necessary for producing the composite material and to be cooled for setting. The limit in using thermoplastic polymers for the fabrication of composite materials is their high viscosity in the molten state. The wetting or correct impregnation of the fibers by the thermoplastic polymer can only be achieved, if the thermoplastic resin is sufficiently fluid. In order to have a low viscosity or sufficient fluidity of the thermoplastic polymer the chain length (molecular mass) can be reduced. However a too low molecular weight has a negative impact on the performance of the composite material especially the mechanical properties. On the other hand the temperature of the thermoplastic polymer could be increased in order to reduce the viscosity in an important way. Consequently the continuous working temperature is relatively high, above 200° C., influencing directly the economics (costs) of the composite material due to implication of high energy costs. Additionally thermoplastic polymers tend to degrade if the temperature is very high, which is especially true for semicrystalline thermoplastic polymers that have high melting points as for example polyamides (for example PA6.6), polyethersulfon (PES), polyetherimid (PEI), polyetheretherketon (PEEK) or polyphenylene sulfide (PPS). This thermo induced degradation yields to a decreasing molecular weight of the polymer matrix important for the cohesion of the composite material.

Another way for impregnating the fibrous substrate is to dissolve the thermoplastic polymer in an organic solvent. However this method requires a lot of solvent that has to be evaporated. There are environmental issues in using large quantities of solvent in term of energy and pollution.

In order to prepare a polymeric composite material based on thermoplastic polymer, a thermoplastic polymer resin, commonly known as a "syrup", is used to impregnate the reinforcing material, for example a fibrous substrate. Once polymerized, the thermoplastic polymeric syrup constitutes the matrix of the composite material. At the time of impregnation, when preparing polymeric composites, the viscosity of the impregnation syrup must be controlled and adapted so as not to be too fluid or too viscous, so as to impregnate correctly each fibre of the fibrous substrate. When the wetting is partial, depending on whether the syrup is too fluid or too viscous, "naked" zones, i.e. non-impregnated zones, and zones in which drops of polymer form on the fibres, which are the cause of the creation of bubbles, respectively appear. These "naked" zones and these bubbles give rise to the appearance of defects in the final composite material, which are the cause, inter alia, of a loss of mechanical strength of the final composite material. However the viscosity range useful for the impregnation is low for stocking such material.

These are the limits or disadvantages for the preparation of thermoplastic composite especially with fibrous reinforcements.

To allow thermoforming and recycling, it is preferred to use thermoplastic polymers also in composite materials.

There is a need of a thermoplastic precursor composition that can be stocked easily for a reasonable time, for preparing a prepreg and a thermoplastic composite. Furthermore there is also a need for a method preparing a thermoplastic precursor composition or prepreg of a thermoplastic composite.

The objective of the present invention is to have a precursor composition for preparing a prepreg for thermoplastic composites.

The further objective of the present invention is to have precursor composition that can be transformed to a prepreg and further to a polymeric thermoplastic composite material with satisfying mechanical properties which can be transformed and shaped into form.

Another objective of the present invention is to have a precursor composition that can be transformed to a prepreg and further to a polymeric thermoplastic composite material where the polymeric matrix can be easily recycled and repaired.

Still another objective of the present invention is to have a method for preparing a precursor composition that can be transformed a prepreg and further to a polymeric thermoplastic composite material, where the fibrous material is correctly and completely wetted, where precursor to polymeric composite material can be stocked.

An additional objective is to provide a prepreg composition that can be transformed to a polymeric thermoplastic composite material.

BACKGROUND OF THE INVENTION

Prior Art

The document WO2013/056845 discloses a composite material via in-situ polymerization of thermoplastic (meth) acrylic resins. The polymeric composite material obtained by in-situ polymerization of a thermoplastic (meth)acrylic resin and a fibrous material containing long fibers and its use, a process for making such a composite material and mmanufactured mechanical or structured part or article comprising this polymeric composite material. The polymerization uses a radical initiator chosen from diacyl peroxides, peroxy esters, dialkyl peroxides, peroxyacetals or azo compounds. The document does not disclose a composition comprising a mixture of two initiators, one of the being activated by absorption of radiation. The document does not disclose neither the preparation of a prepreg.

The document WO2014/013028 an impregnation process for a fibrous substrate, a liquid (meth) acrylic syrup for the impregnation process, its method of polymerization and structured article obtained thereof. The liquid (meth) acrylic syrup comprises a (meth)acrylic polymer, a (meth)acrylic monomer and at least one initiator or initiating system for starting the polymerization of the (meth) acrylic monomer. The initiators or initiating systems that are activated by heat. The document does not disclose a composition comprising a mixture of two initiators, one of the being activated by absorption of radiation. The document does not disclose neither the preparation of a prepreg.

The document WO2014/174098 discloses a liquid (meth) acrylic syrup its method of polymerization, use and molded article obtained thereof. The liquid (meth) acrylic syrup comprises an initiation system for polymerization at low temperature said initiating system comprises at least one accelerator, at least one organic aldehyde, at least one peracid and at least one liquid peroxy compound. The document does not disclose a composition comprising a mixture of two initiators, one of the being activated by absorption of radiation. The document does not disclose neither the preparation of a prepreg.

The document EP2471849 discloses a method for manufacturing an acrylic film. The acrylic film is made by using an acrylic syrup comprising an acrylic polymer, a reactive monomer and a photoinitiator. The syrup can further comprise a thermal initiator if needed.

All the prior art documents do not disclose neither the preparation of a prepreg nor composition comprising a mixture of two initiators, one of the being activated by absorption of radiation.

BRIEF DESCRIPTION OF THE INVENTION

Surprisingly it has been found that liquid composition LC1 suitable for impregnation of a fibrous substrate, the preparation of a prepreg and a polymeric composite, said liquid composition is comprising, a) a (meth)acrylic polymer (P1), b) a (meth)acrylic monomer (M1), and c) two initiators (Ini1) and (Ini2), said liquid composition is having a dynamic viscosity of between 10 mPa*s and 10 000 mPa*s at 25° C., characterized in that the initiator (Ini1) is activated by absorption of radiation and the initiator (Ini2) is activated by heat, allows to provide an impregnation liquid for the preparation of thermoplastic prepregs.

Surprisingly it has been found that a composition PRE1 suitable for the preparation of a prepreg PRE2 and a polymeric composite, said composition PRE1 is comprising, a) a (meth)acrylic polymer (P1), b) a (meth)acrylic monomer (M1), and c) two initiators (Ini1) and (Ini2), d) a fibrous material characterized in that the initiator (Ini1) is activated by absorption of radiation and the initiator (Ini2) is activated by heat, allows the preparation of thermoplastic prepregs.

Surprisingly it has also been discovered that a method for preparing a composition PRE2 comprising a (meth)acrylic polymer (P1), (meth)acrylic monomer (M1), a fibrous material and at least initiators (Ini2), comprising following steps i) impregnating the fibrous material with a liquid composition LC1 comprising the (meth)acrylic polymer (P1), (meth)acrylic monomer (M1) and at least two initiators (Ini1) and (Ini2)

ii) polymerizing partly the product obtained in step i) by using initiator (Ini1), characterized in that the initiator (Ini1) is activated by absorption of radiation and the initiator (Ini2) is activated by heat, allows the preparation of thermoplastic prepregs.

Surprisingly it has also been discovered that liquid composition LC1 comprising the (meth)acrylic polymer (P1), (meth)acrylic monomer (M1) and at least two initiators (Ini1) and (Ini2) can be used for preparing a composition PRE1 comprising a) a (meth)acrylic polymer (P1), b) a (meth)acrylic monomer (M1), and c) two initiators (Ini1) and (Ini2), d) a fibrous material characterized in that the initiator (Ini1) is activated by absorption of radiation and the initiator (Ini2) is activated by heat.

Surprisingly it has also been discovered that method for preparing polymeric composite from a composition PRE2 comprising a (meth)acrylic polymer (P1), (meth)acrylic monomer (M1), a fibrous material and at least initiators (Ini2), comprising following steps i) impregnating the fibrous material with a liquid composition LC1 comprising the (meth)acrylic polymer (P1), (meth)acrylic monomer (M1) and at least two initiators (Ini1) and (Ini2)

ii) polymerizing partly the product obtained in step i) by using initiator (Ini1), iii) stocking the product prepared in step ii)

iv) continuing the polymerization by using initiator (Ini2), characterized in that the initiator (Ini1) is activated by absorption of radiation and the initiator (Ini2) is activated by heat, allows the preparation of thermoplastic composite.

DETAILED DESCRIPTION OF THE INVENTION

According to a first aspect, the present invention relates to a liquid composition LC1 suitable for impregnation of a fibrous material, the preparation of a prepreg and a polymeric composite, said liquid composition LC1 is comprising, a) a (meth)acrylic polymer (P1), b) a (meth)acrylic monomer (M1), and c) two initiators (Ini1) and (Ini2), said liquid composition LC1 is having a dynamic viscosity of between 10 mPa*s and 10 000 mPa*s at 25° C., characterized in that the initiator (Ini1) is activated by absorption of radiation and the initiator (Ini2) is activated by heat.

According to a second aspect, the present invention relates to a composition PRE1 suitable for the preparation of a prepreg PRE2 and a polymeric composite, said composition is comprising, a) a (meth)acrylic polymer (P1), b) a (meth)acrylic monomer (M1), and c) two initiators (Ini1) and (Ini2), d) a fibrous material characterized in that the initiator (Ini1) is activated by absorption of radiation and the initiator (Ini2) is activated by heat.

According to a third aspect the present invention relates to a method for preparing a composition PRE2 comprising a (meth)acrylic polymer (P1), (meth)acrylic monomer (M1), a fibrous material and at least initiators (Ini2), comprising following steps i) impregnating the fibrous material with a liquid composition LC1 comprising the (meth)acrylic polymer (P1), (meth)acrylic monomer (M1) and at least two initiators (Ini1) and (Ini2)

ii) polymerizing partly the product obtained in step i) by using initiator (Ini1), characterized in that the initiator (Ini1) is activated by absorption of radiation and the initiator (Ini2) is activated by heat.

According to a fourth aspect the present invention relates to use of a liquid composition LC1 comprising the (meth) acrylic polymer (P1), (meth)acrylic monomer (M1) and at least two initiators (Ini1) and (Ini2) for preparing a composition PRE1 comprising a) a (meth)acrylic polymer (P1), b) a (meth)acrylic monomer (M1), and c) two initiators (Ini1) and (Ini2), d) a fibrous material characterized in that the initiator (Ini1) is activated by absorption of radiation and the initiator (Ini2) is activated by heat.

According to a fifth aspect the present the present invention relates to a method for preparing polymeric composite from a composition PRE2 comprising a (meth)acrylic polymer (P1), (meth)acrylic monomer (M1), a fibrous material and at least initiators (Ini2), comprising following steps i) impregnating the fibrous material with a liquid composition LC1 comprising the (meth)acrylic polymer (P1), (meth)acrylic monomer (M1) and at least two initiators (Ini1) and (Ini2)

ii) polymerizing partly the product obtained in step i) by using initiator (Ini1), iii) stocking the product prepared in step ii)

iv) continuing the polymerization by using initiator (Ini2), characterized in that the initiator (Ini1) is activated by absorption of radiation and the initiator (Ini2) is activated by heat.

By the term "(meth)acrylic" as used is denoted any kind of acrylic and methacrylic monomers.

By the term "PMMA" as used are denoted homo- and copolymers of methylmethacrylate (MMA), for the copolymer of MMA the weight ratio of MMA inside the PMMA is at least 70 wt %.

By the term "monomer" as used is denoted is a molecule which can under go polymerization.

By the term "polymerization" as used is denoted the process of converting a monomer or a mixture of monomers into a polymer.

By the term "thermoplastic polymer" as used is denoted a polymer that turns to a liquid or becomes more liquid or less viscous when heated and that can take on new shapes by the application of heat and pressure. This applies also for slightly crosslinked thermoplastic polymers that can be thermoformed when heated above the softening temperature.

By the term "thermosetting polymer" as used is denoted a prepolymer in a soft, solid or viscous state that changes irreversibly into an infusible, insoluble polymer network by curing.

By the term "prepreg" as used are denoted composition of a fibrous substrate that have been impregnated with a curable prepolymer, or liquid reactants or a thermoplastic polymer and can be further polymerized.

By the term "prepolymer" as used is denoted a polymer or oligomer whose molecules are capable of entering, through reactive groups, into further polymerization.

By the term "oligomer" as used is denoted a polymeric molecule of intermediate relative molecular mass, comprising between 5 and 500 monomer units.

By the term "polymer composite" as used is denoted a multicomponent material comprising multiple different phase domains in which at least one type of phase domain is a continuous phase and in which at least one component is a polymer.

By the term "initiator" as used is denoted a chemical species that forms compound or an intermediate compound that starts the polymerization of a monomer, that to capable of linking successively with a large number of other monomers into a polymeric compound.

By the abbreviation "phr" is meant weight parts per hundred parts of composition. For example 1 phr of initiator in the composition means that 1 kg of initiator is added to 100 kg of composition.

By the abbreviation "ppm" is meant weight parts per million parts of composition. For example 1000 ppm of a compound in the composition means that 0.1 kg of compound is present in 100 kg of composition.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The liquid composition LC1 or (meth)acrylic syrup according to the invention comprises a (meth)acrylic polymer (P1), a (meth)acrylic monomer (M1) or a mixture of (meth)acrylic monomers (M1) and (M1+x), and at least two initiators (Ini1) and (Ini2).

The dynamic viscosity of the liquid composition LC1 or (meth) acrylic syrup is in a range from 10 mPa*s to 10000 mPa*s, preferably from 20 mPa*s to 7000 mPa*s and advantageously from 20 mPa*s to 5000 mPa*s and more advantageously from 20 mPa*s to 2000 mPa*s and even more advantageously between 20 mPa*s and 1000 mPa*s. The viscosity of the syrup can be easily measured with a Rheometer or viscosimeter. The dynamic viscosity is measured at 25° C. If the liquid (meth) acrylic syrup has a Newtonian behaviour, meaning no shear thinning, the dynamic viscosity is independent of the shearing in a rheometer or the speed of the mobile in a viscometer. If the liquid composition LC1 has a non-Newtonian behaviour, meaning shear thinning, the dynamic viscosity is measured at a shear rate of 1 $s^{-1}$ at 25° C.

The liquid composition LC1 or (meth)acrylic syrup according to the invention, for impregnating the fibrous substrate, especially comprises a (meth)acrylic monomer (M1) or a mixture of (meth)acrylic monomers, a (meth) acrylic polymer (P1) and at least two different initiators (Ini1) and (Ini2).

As regards the liquid composition LC1 of the invention it comprises a (meth)acrylic monomer (M1), a (meth)acrylic polymer (P1) and at least two different initiators (Ini1) and (Ini2). Once polymerized the (meth)acrylic monomer (M1) is transformed to a (meth)acrylic polymer (P2) comprising the monomeric units of (meth)acrylic monomer (M1).

As regards the (meth)acrylic polymer (P1), mention may be made of polyalkyl methacrylates or polyalkyl acrylates. According to a preferred embodiment, the (meth)acrylic polymer (P1) is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to carbon atoms. As examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.9%, advantageously from 90% to 99.9% and more advantageously from 90% to 99.9% by weight of methyl methacrylate and from 0.1% to 20%, advantageously from 0.1% to 10% and more advantageously from 0.1% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer (P1) should be high, which means greater than 50 000 g/mol and preferably greater than 100 000 g/mol.

The weight-average molecular mass can be measured by size exclusion chromatography (SEC).

The (meth)acrylic polymer (P1) is fully soluble in the (meth)acrylic monomer (M1) or in the mixture of (meth) acrylic monomers. It enables the viscosity of the (meth) acrylic monomer (M1) or the mixture of (meth)acrylic monomers to be increased. The solution obtained is a liquid composition generally called a "syrup" or "prepolymer". The dynamic viscosity value of the liquid (meth)acrylic syrup is between 10 mPa·s and 10 000 mPa·s. The viscosity of the syrup can be readily measured with a rheometer or a viscometer. The dynamic viscosity is measured at 25° C.

Advantageously, the liquid (meth)acrylic composition or syrup contains no additional voluntarily added solvent.

As regards the (meth)acrylic monomer (M1), the monomer is chosen from acrylic acid, methacrylic acid, alkyl acrylic monomers, alkyl methacrylic monomers, hydroxyalkyl acrylic monomers and hydroxyalkyl methacrylic monomers, and mixtures thereof.

Preferably, the (meth)acrylic monomer (M1) is chosen from acrylic acid, methacrylic acid, hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer (M1) is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

According to a preferred embodiment, at least 50% by weight and preferably at least 60% by weight of the (meth) acrylic monomer (M1) is methyl methacrylate.

According to a first more preferred embodiment, at least 50% by weight, preferably at least 60% by weight, more preferably at least 70% by weight, advantageously at least 80% by weight and even more advantageously 90% by weight of the monomer (M1) is a mixture of methyl methacrylate with optionally at least one other monomer.

As the liquid composition LC1 or (meth)acrylic syrup according to the invention can comprise a (meth)acrylic monomer (M1) or a mixture of (meth)acrylic monomers; a mixture of (meth)acrylic monomers (M1) and (M1+x) is also referred to simply as the (meth)acrylic monomer(s) (M1).

As regards the fibrous substrate, mention may be made of several fibres, uni directional rovings or continuous filament mat, fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibres. When the fibres are continuous, their assembly forms fabrics.

The one-dimensional form corresponds to linear long fibres. The fibres may be discontinuous or continuous. The fibres may be arranged randomly or parallel to each other, in the form of a continuous filament. A fibre is defined by its aspect ratio, which is the ratio between the length and diameter of the fibre. The fibres used in the present invention are long fibres or continuous fibres. The fibres have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibres, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibres or mixtures thereof, an assembly of the two-dimensional form in the third dimension.

The origins of the fibrous material may be natural or synthetic. As natural material one can mention plant fibres, wood fibres, animal fibres or mineral fibres.

Natural fibres are, for example, sisal, jute, hemp, flax, cotton, coconut fibres, and banana fibres. Animal fibres are, for example, wool or hair.

As synthetic material, mention may be made of polymeric fibres chosen from fibres of thermosetting polymers, of thermoplastic polymers or mixtures thereof.

The polymeric fibres may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibres may also be chosen from glass fibres, especially of E, R or S2 type, carbon fibres, boron fibres or silica fibres.

The fibrous substrate of the present invention is chosen from plant fibres, wood fibres, animal fibres, mineral fibres, synthetic polymeric fibres, glass fibres and carbon fibres, and mixtures thereof.

Preferably, the fibrous substrate is chosen from mineral fibres. More preferably the fibrous substrate is chosen from glass fibres or carbon fibres.

The fibres of the fibrous substrate have a diameter between 0.005 μm and 100 μm, preferably between 1 μm and 50 μm, more preferably between 5 μm and 30 μm and advantageously between 10 μm and 25 μm.

Preferably, the fibres of the fibrous substrate of the present invention are chosen from continuous fibres (meaning that the aspect ratio does not necessarily apply as for long fibres) for the one-dimensional form, or for long or continuous fibres for the two-dimensional or three-dimensional form of the fibrous substrate.

With regard to the initiators (Ini1) and (Ini2), the initiator (Ini1) is activated by absorption of radiation and the initiator (Ini2) is activated by heat.

The radiation activated initiator (Ini1) is preferably activated by absorption of radiation that can be ultraviolet, visible or infrared radiation. Preferably it is ultraviolet (UV) or visible radiation.

This is also called photopolymerization and the corresponding initiators are called photoinitators.

The photoinitiator is chosen from free radical photoinitiators of type I or free radical photoinitiators type II or family of dyes.

Type I photoinitiators are chosen from acetophenones, alkoxyacetophenones, hydroxyacetophenones, alkylaminoacetophenones, benzoin ethers or phosphine oxides.

Type II photoinitiators are chosen from benzophenones, hioxanthones, chinones, benzoyl formate esters, dibenzylidene ketones or coumarins.

The photoinitiators of the family of dyes such as triazines and derivatives, fluorones and derivatives, cyanines and derivatives, saffranines and derivatives, 4,5,6,7-tetrachloro-3', 6'-dihydroxy 2', 4', 5', 7'-tetraiodo-3H-spiro [isobenzofuran-1,9'-xanthen]-3-one, pyrylium and thiopyrylium and derivatives, thiazines and derivatives, flavins and derivatives, pyronines and derivatives, oxazines and derivatives, rhodamines and derivatives.

The heat activated initiator (INI2) is preferably a radical initiator.

The radical initiator (Ini2) can be chosen from peroxy group comprising compound or azo group comprising compounds and preferably from peroxy group comprising compound.

Preferably the peroxy group comprising compound comprises from 2 to 30 carbon atoms.

Preferably the peroxy group comprising compound is chosen from diacyl peroxides, peroxy esters, peroxydicarbonates, dialkyl peroxides, peroxyacetals, hydroperoxide or peroxyketale.

More preferably, the second initiator (Ini2) has a half-life time $t_{1/2}$ of 1 hour at a temperature of at least 60° C., preferably at least 65° C., more preferably at least 70° C., still more preferably of at least 75° C.

More preferably, the second initiator (Ini2) has a half-life time $t_{1/2}$ of at least 1 hour at a temperature between 60° C. and 150° C., preferably between 65° C. and 150° C., more preferably between 70° C. and 145° C., still more preferably between 75° C. and 140° C. and even more preferably between 75° C. and 130° C.

The initiator (Ini2) is chosen from diisobutyryl peroxide, cumyl peroxyneodecanoate, di(3-methoxybutyl) peroxydicarbonate, 1,1,3,3-Tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)-peroxydicarbonate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy) cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di (tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide, 3,6,9-triethyl-3,6,9-trimethyl-1,4,7-triperoxonane, 2,2'-azobis-isobutyronitrile (AIBN), 2,2'-azodi-(2-methylbutyronitrile), azobisisobutyramide, 2,2'-azobis(2,4-dimethylvaleronitrile), 1,1'-Azodi(hexahydrobenzonitrile), or 4,4'-azobis(4-cyano-pentanoic).

Preferably the initiator (Ini2) is chosen from tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide or 3,6,9-triethyl-3,6,9-trimethyl-1,4,7-triperoxonane.

In one embodiment of the present invention there are at least two different radical initiators (Ini2). This can be two different radical initiators that generate radicals at different temperatures. The difference of the temperature for a given half life time between the two different initiators (Ini2) is at least 5K. This means if for a half-life time $t_{1/2}$ of 1 hour the temperature of first (Ini2) is 75° C., that the temperature of second (Ini2) for a half-life time $t_{1/2}$ of 1 hour is at least 80° C.

With regard to the liquid resin LC1 according to the invention that impregnates the fibrous material, it comprises a (meth)acrylic polymer (P1), a (meth)acrylic monomer (M1) or a mixture of (meth)acrylic monomers (M1) and (M1+x), and at least two initiators (Ini1) and (Ini2).

The quantity of the two initiators (Ini1) and (Ini2) together in the liquid composition LC1 is at least 0.1 phr relative to the sum of (meth)acrylic monomer (M1) and (meth)acrylic polymer (P1). Preferably the quantity of two initiators (Ini1) and (Ini2) together in the composition is at least 0.2 phr, more preferably at least 0.5 phr, even more preferably at least 0.75 phr and advantageously at least 1 phr relative to the sum of (meth)acrylic monomer (M1) and (meth)acrylic polymer (P1).

The quantity of the two initiators (Ini1) and (Ini2) together in the composition is at most 15 phr of relative to the sum of (meth)acrylic monomer (M1) and (meth)acrylic polymer (P1). Preferably the quantity of the two initiators (Ini1) and (Ini2) together in the composition is at most 12 phr, more preferably at most 10 phr, even more preferably at most 8 phr and advantageously at most 5 phr relative to the sum of (meth)acrylic monomer (M1) and (meth)acrylic polymer (P1).

The quantity of the two initiators (Ini1) and (Ini2) together in the composition is between 0.1 phr and 15 phr relative to the sum of (meth)acrylic monomer (M1) and (meth)acrylic polymer (P1). Preferably the quantity of the two initiators (Ini1) and (Ini2) together in the composition is between 0.2 phr and 12 phr, more preferably between 0.5 phr and 10 phr, even more preferably between 0.75 phr and 8 phr and advantageously at most between 1 phr and 5 phr relative to the sum of (meth)acrylic monomer (M1) and (meth) acrylic polymer (P1).

The quantity of the initiator (Ini1) in the composition is between 0.1 phr and 5 phr relative to the sum of (meth) acrylic monomer (M1) and (meth)acrylic polymer (P1). Preferably the quantity of the initiator (Ini1) in the composition is between 0.2 phr and 4 phr, more preferably between 0.3 phr and 3 phr, and advantageously at most between 0.5 phr and 2 phr relative to the sum of (meth)acrylic monomer (M1) and (meth)acrylic polymer (P1).

The (meth)acrylic monomer (M1) or the (meth)acrylic monomers in the liquid composition LC1 present at least 40% by weight, preferably 50% by weight, advantageously 60% by weight and more advantageously 65% by weight of total liquid (meth) acrylic syrup.

The (meth)acrylic monomer (M1) or the (meth)acrylic monomer(s) (M1) in the liquid composition LC1 or (meth) acrylic syrup are present in proportions of between 40% and 90% by weight and preferably between 45% and 85% by weight of the composition comprising the (meth)acrylic monomer (M1) or (meth)acrylic monomer(s) (M1) and (meth)acrylic polymer (P1).

The (meth)acrylic polymer (P1) or the (meth)acrylic polymer(s) (P1) in the liquid composition LC1 or (meth) acrylic syrup are present in a proportion of at least 1% by weight, preferably at least 5% and more preferably at least 10% by weight, even more preferable at least 15%, advantageously at least 18% and more advantageously at least 20% by weight of the composition comprising (meth)acrylic monomer(s) (M1) and (meth)acrylic polymer (P1) or (meth) acrylic polymer(s) (P1).

The (meth)acrylic polymer (P1) or (meth)acrylic polymer (s) (P1) in the liquid (meth)acrylic syrup LC1 are present in a proportion of not more than 50% by weight, preferably not more than 40% and advantageously not more than 30% by weight of the composition comprising (meth)acrylic monomer(s) (M1) and (meth)acrylic polymer (P1) or (meth) acrylic polymer(s) (P1).

After impregnation the composition PRE1 is obtained, it comprises a (meth)acrylic polymer (P1), a (meth)acrylic monomer (M1) or a mixture of (meth)acrylic monomers (M1) and (M1+x), at least two initiators (Ini1) and (Ini2) and the fibrous material.

After impregnation and a partly polymerization the composition PRE2 is obtained, it comprises a (meth)acrylic polymer (P1), a (meth)acrylic monomer (M1) or a mixture of (meth)acrylic monomers (M1) and (M1+x), initiator (Ini2) and the fibrous material.

The composition PRE2 can be stocked. The composition PRE2 can be stocked between two films.

With regard to the film according to the composition of the present invention, it is a polymeric film. Preferably the film is made of a thermoplastic polymer.

The composition PRE2 is a prepreg. Prepregs are being increasingly used in high performance applications in the composites industry and also in other sectors. Some key areas where prepregs currently find use are listed below:

Aircraft interiors, aerospace components, aircraft flooring, cargo liners,

Automotive parts and components, tooling, ballistic panels,

A/C ducting, electronic-transmission applications,

UV resistant parts, sporting goods, high temperature parts,

Honeycomb and foam panels, flame retardant laminates,

- Carbon-carbon composites, high-rise flooring, high impact surfaces,
- UAVs, seatbacks, doublers.

With regard to the method preparing the liquid composition LC1: all components can be mixed in a recipient in order to obtain the liquid composition LC1 according to the invention.

A process for preparing a liquid composition LC1 comprises the following steps:

i) preparing a mixture of (meth)acrylic polymer (P1) and (meth)acrylic monomer (M1)

ii) adding initiators (Ini1) and (Ini2) together or one after the other to the mixture prepared in previous step An aspect the present invention relates to a method for preparing polymeric composite from a composition comprising a (meth)acrylic polymer (P1), (meth)acrylic monomer (M1), a fibrous material and at least initiator (Ini2), comprising following steps:

i) impregnating the fibrous material with a liquid composition LC1 comprising the (meth)acrylic polymer (P1), (meth)acrylic monomer (M1) and at least two initiators (Ini1) and (Ini2)

ii) polymerizing partly the product obtained in step i) by using initiator (Ini1), iii) stocking the product prepared in step ii)

iv) continuing the polymerization by using initiator (Ini2), characterized in that the initiator (Ini1) is activated by absorption of radiation and the initiator (Ini2) is activated by heat.

After step i) the composition PRE1 is obtained, comprising the (meth)acrylic polymer (P1), (meth)acrylic monomer (M1), at least two initiators (Ini1) and (Ini2) and fibrous substrate.

With regard to step ii) the partial polymerization, it is done by polymerizing a part of the (meth)acrylic monomer (M1) by using initiator (Ini1) which is activated by absorption of radiation.

Preferably the conversion of the (meth)acrylic monomer (M1) in step ii) is between 30% and 90%, more preferably between 40% and 80%, even more preferably between 50% and 75%, most preferably between 55% and 75% and advantageously between 58% and 70%.

Preferably the polymerization temperature in step ii) is between 0° C. and 40° C., more preferably between 5° C. and 35° C., still more preferably between 10° C. and 35° C. and even more preferably between 15° C. and 30° C.

After step ii) the composition PRE2 is obtained, comprising the (meth)acrylic polymer (P1), the (meth)acrylic monomer (M1), the initiators (Ini2) and fibrous substrate. The initiator (Ini1) has been used to partly polymerize the (meth)acrylic monomer (M1).

Preferably the source of light of radiation for the polymerization in step ii) emits radiation of wavelength λ (nm) in the range from 200 nm to 800 nm, and still preferably in the range from 250 nm to 500 nm.

With regard to step iii) the stocking, it is done at a temperature below 35° C. Preferably the stocking is done in view of the half-life temperature $T_{1/2}$ of initiator (Ini2). More preferably the stocking is done at least 40K below the half-life temperature $T_{1/2}$ of 1 hour of initiator (Ini2), even more preferably at least 50K, still more preferably at least 60K, advantageously at least 70K and more advantageously at least 80K below the half-life temperature $T_{1/2}$ of 1 hour of initiator (Ini2).

With regard to step iv) continuing the polymerization, it can be further polymerized by the following methods: thermo compression, thermo compression with injection of thermoplastic polymer, continuous method for hollow structures, compacting under vacuum, compacting under vacuum with a (meth)acrylic surface layer, resin transfer molding on composition of the invention and filament winding.

By continuing the polymerization of the composition PRE2 in step iv), a polymeric composite or polymeric composite material is obtained.

According to a first preferred embodiment of the method of continuing the polymerization the composition PRE2 of the present invention, it is thermo compression.

According to a second preferred embodiment of the method of continuing the polymerization the composition PRE2 of the present invention, it is compacting under vacuum.

According to a third preferred preferred embodiment of continuing the polymerization the composition PRE2 of the present invention, it is filament winding.

The method for preparing polymeric composite according to steps i) to iv) given earlier can be filament winding as well.

The process for manufacturing composite parts, but also mechanical or structured parts or products, can additionally comprise the step of post forming. The post forming includes bending as changing the form of the composite part.

The process for manufacturing composite parts, but also mechanical or structured parts or products, can additionally comprise the step of welding or gluing or laminating.

The thermoplastic composite parts obtained from the processes according to the invention can be post formed after polymerization of the liquid composition of the invention. The forming includes bending as changing the form of the composite.

The thermoplastic parts or manufactured composite parts obtained after polymerization of the composition of the invention and/or from the processes according to the invention can be welded, glued or laminated.

With regard to the use of polymeric composite material, one can mention automotive and motorsports applications as for example pressure vessel, ballistic & defense applications, marine applications, railroad and transport applications, sport, leisure and recreational applications, arts and entertainments applications, aeronautic and aerospace applications, construction and civil engineering applications, oil & gas applications, renewable applications such as photovoltaic applications and wind energy applications.

As regards the use of the mechanical parts made of composite material thus manufactured, mention may be made of automotive applications, transport applications such as buses or lorries, marine applications, railroad applications, sport, aeronautic and aerospace applications, photovoltaic applications, computer-related applications, construction and building applications, telecommunication applications and wind energy applications.

The mechanical part made of composite material is especially a motor vehicle part, boat part, bus part, train part, sport article, plane or helicopter part, space ship or rocket part, photovoltaic module part, a material for construction or building, wind turbine part for example spar cap of girder of wind turbine blade, furniture part, construction or building part.

Figures: FIG. 1—a method for preparing a composition PRE2 (1) in form of a sheet from liquid composition LC1 (3) of the present invention: a fibrous material (2) is coming from a roll (4) is impregnated with a liquid composition LC1 (3) coming from a feeder (5) between two rolls (6) which produces composition PRE 1 (10) which is polymerized partly with a UV source (15) in order to obtain a thermoplastic prepreg.

EXAMPLES

One example as is shown in FIG. 1, a roll (4) of a carbon tow or glass yarn (2) as fibrous material is impregnated with liquid composition LC1 (3). Liquid composition LC1 (3) is added with the help of a feeder (5). Impregnation of the fibrous material takes place between two rolls (6). Composition PRE1 (10) is obtained. Partly polymerization is initiated with the help of UV lamps (15). The composition PRE2 (1) is obtained. A thermoplastic film (20) is added to each side of the composition PRE2 (1), the product is cut to sheets (1*b*) with the help of a cutter (25).

Composition (1*b*) in form of a sheet is compression molded and a thermoplastic material is obtained.

The invention claimed is:

1. A liquid composition LC1 suitable for impregnation of a fibrous substrate comprising fibres, the preparation of a prepreg and a polymeric composite, said liquid composition comprising, a) a (meth)acrylic polymer (P1), b) a (meth)acrylic monomer (M1), wherein the monomer (M1) is a mixture of at least 60% by weight methyl methacrylate and at least one other monomer, and c) two initiators (Ini1) and (Ini2), wherein the quantity of the two initiators (Ini1) and (Ini2) together in the composition is between 0.75 phr and 15 phr relative to the sum of (meth)acrylic monomer (M1) and (meth) acrylic polymer (P1), said liquid composition having a dynamic viscosity of between 10 mPa*s and 10,000 mPa*s at 25° C., wherein the initiator (Ini1) is a photoinitiator configured to be activated by absorption of radiation and the initiator (Ini2) is a heat activated initiator configured to be activated by heat, wherein the (meth)acrylic polymer (P1) is present in a proportion of not more than 30% by weight relative to the sum of (meth)acrylic monomer (M1) and (meth) acrylic polymer (P1), wherein the quantity of initiator (Ini1) in the composition is between 0.5 phr and 2 phr relative to the sum of (meth)acrylic monomer (M1) and (meth)acrylic polymer (P1), and wherein the initiator (Ini1) is selected from the group consisting of acetophenones, alkoxyacetophenones, hydroxyacetophenones, alkylaminoacetophenones, benzoin ethers, phosphine oxides; benzophenones, thioxanthones, chinones, benzoyl formate esters, dibenzylidene ketones or coumarins; dyes, triazines and derivatives, fluorones and derivatives, cyanines and derivatives, saffranines and derivatives, 4,5,6,7-tetrachloro-3', 6'-dihydroxy 2', 4' 5', 7'-tetraiodo-3H-spiro [isobenzofuran-1,9'-xanthen]-3-one, pyrylium and thiopyrylium and derivatives, thiazines and derivatives, flavins and derivatives, pyronines and derivatives, oxazines and derivatives, and rhodamines and derivatives, and wherein initiator (Ini2) has a half-life time $t_{1/2}$ of at least 1 hour at a temperature of at least 60° C.

2. The liquid composition LC1 according to claim 1, wherein initiator (Ini1) is activated by radiation selected from the group consisting of ultraviolet, visible, and infrared radiation.

3. The liquid composition LC1 according to claim 1, wherein the initiator (Ini2) is selected from the group consisting of diacyl peroxides, peroxy esters, peroxydicarbonates, dialkyl peroxides, peroxyacetals, hydroperoxide, peroxyketale, diisobutyryl peroxide, cumyl peroxyneodecanoate, di(3-methoxybutyl) peroxydicarbonate, 1,1,3,3-tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)-peroxydicarbonate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy) valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy) hexyne-3, di-tert-butyl peroxide, 3,6,9-triethyl-3,6,9-trimethyl-1,4,7-triperoxonane, 2,2'-azobis-isobutyronitrile (AIBN), 2,2'-azodi-(2-methylbutyronitrile), azobisisobutyramide, 2,2'-azobis(2,4-dimethylvaleronitrile), 1,1'-Azodi (hexahydrobenzonitrile), or 4,4'-azobis(4-cyanopentanoic).

4. The liquid composition LC1 according to claim 1, wherein there are at least two different radical initiators (Ini2).

5. The liquid composition LC1 according to claim 4, wherein the difference of the temperature for a given half life time between the two different initiators (Ini2) is at least 5K.

6. The liquid composition LC1 according to claim 1, wherein the (meth)acrylic polymer (P1) comprises at least 70%, by weight of methyl methacrylate monomer units.

7. The liquid composition LC1 according to claim 1, wherein the (meth)acrylic polymer (P1) has weight-average molecular mass Mw greater than 100,000 g/mol.

8. The liquid composition LC1 according to claim 1, wherein the (meth)acrylic monomer (M1) is a mixture of at least 90% by weight methyl methacrylate and at least one other monomer.

9. The liquid composition LC1 according to claim 1, wherein the fibres of the fibrous substrate have an aspect ratio of at least 1000.

10. The liquid composition LC1 according to claim 1, wherein the fibres of the fibrous substrate have a diameter between 0.005 μm and 100 μm.

11. A process for impregnating a fibrous substrate, said fibrous substrate consisting of long fibers and said process comprising a step of impregnating said fibrous substrate with a liquid composition LC1 according to claim 1.

12. A method for preparing a polymeric composite from a composition comprising a (meth)acrylic polymer (P1), (meth)acrylic monomer (M1), a fibrous material and at least initiators (Ini1) and (Ini2), comprising following steps:

i) impregnating the fibrous material with a liquid composition LC1 according to claim 1, ii) polymerizing partly the product obtained in step i) by using initiator (Ini1) to form prepreg composition PRE2, iii) storing the product prepared in step ii)

iv) continuing the polymerization by using initiator (Ini2), wherein the initiator (Ini1) is activated by absorption of radiation and the initiator (Ini2) is activated by heat.

13. The method according to claim 12 wherein the conversion of the (meth)acrylic monomer (M1) in step ii) is between 30% and 90%.

14. The method according to any of claim 12 wherein the polymerization temperature in step ii) is between 0° C. and 40° C.

15. The method according to any of claim 12 wherein source of light of radiation for the polymerization in step ii) emits radiation of wavelength λ (nm) in the range from 200 nm to 800.

16. The method according to claim 12 wherein the storing of step iii), it is done at a temperature below 35° C. and at least 40K below the half-life temperature $T_{1/2}$ of 1 hour of initiator (Ini2).

17. The method according to claim 12 wherein the step iv) continuing the polymerization is done by one of the following methods: thermo compression, thermo compression with injection of thermoplastic polymer, continuous method for hollow structures, compacting under vacuum, compacting under vacuum with a (meth)acrylic surface layer, resin transfer molding on composition of the invention and filament winding.

18. A polymeric composite material obtained by a process according to claim 12.

19. Mechanical parts made of a composite material according to claim 18 wherein said mechanical part is selected from a part in automotive applications, transport applications, buses, lorries, marine applications, railroad applications, sport, aeronautic and aerospace applications, photovoltaic applications, computer-related applications, construction and building applications, telecommunication applications, wind energy applications, a pressure vessel, ballistic & defense applications, leisure and recreational applications, arts and entertainments applications, civil engineering applications, oil & gas applications, renewable energy applications and photovoltaic applications.

* * * * *